US012053064B2

(12) United States Patent
Gale et al.

(10) Patent No.: US 12,053,064 B2
(45) Date of Patent: Aug. 6, 2024

(54) STACKABLE MAGNETIC NUMISMATIC

(71) Applicant: Asset Marketing Services, LLC, Eagan, MN (US)

(72) Inventors: William Gale, Lakewood Ranch, FL (US); Robert Becka, Eagan, MN (US); David Welch, Farmington, MN (US); Bob Wilkie, Farmington, MN (US); Mike Esson, New Hope, MN (US); Peter Gu, Shanghai (CN)

(73) Assignee: Asset Marketing Services, LLC

( * ) Notice: Subject to any disclaimer, the term of this patent is extended or adjusted under 35 U.S.C. 154(b) by 264 days.

(21) Appl. No.: 17/667,918

(22) Filed: Feb. 9, 2022

(65) Prior Publication Data

US 2022/0248815 A1 Aug. 11, 2022

Related U.S. Application Data

(60) Provisional application No. 63/147,309, filed on Feb. 9, 2021.

(51) Int. Cl.
*A44C 21/00* (2006.01)
*B44C 1/24* (2006.01)

(52) U.S. Cl.
CPC ................ *A44C 21/00* (2013.01); *B44C 1/24* (2013.01)

(58) Field of Classification Search
CPC .................................. A44C 21/00; B44C 1/24
See application file for complete search history.

(56) References Cited

U.S. PATENT DOCUMENTS

| | | | | |
|---|---|---|---|---|
| 6,150,913 A * | 11/2000 | Simmons | G09F 19/02 446/132 |
| 6,514,374 B1 * | 2/2003 | Zurawski | A44C 21/00 72/359 |
| 2010/0192430 A1 * | 8/2010 | Lawrence | A44C 21/00 40/27.5 |
| 2016/0071440 A1 * | 3/2016 | Hibbert | B23K 7/00 40/27.5 |

FOREIGN PATENT DOCUMENTS

| | | |
|---|---|---|
| CN | 105705056 A | 6/2016 |
| EP | 0733316 A3 | 4/1998 |
| JP | 3200337 U | 10/2015 |

* cited by examiner

*Primary Examiner* — Gary C Hoge
(74) *Attorney, Agent, or Firm* — GRUMBLES LAW PLLC; Bryan Kravis

(57) ABSTRACT

A stackable form of a numismatic that includes a visible, centrally embedded magnet for the purpose of reducing plastic waste by providing storage modalities for such that preclude the need for plastic sleeve holders. The stackable magnetic numismatic may also include embossed and debossed formations, decorations, and/or script. Such stackable magnetic numismatics may be displayed within a balanced magnetic field of a decorative device.

10 Claims, 10 Drawing Sheets

STACKABLE MAGNETIC NUMISMATIC

FIELD

This disclosure relates to numismatics, particularly to such numismatics that may include bullion or coinage embedded with magnets to allow their uniform stacking without the need for a plastic sleeve or other such holding devices.

BACKGROUND

In our society, there is an ever-present mindset that plastics are flooding the environment. Stories in newspapers from all points of the globe discuss the buildup of plastic waste in their areas. A recent New York Times article, "Hidden Beneath the Ocean's Surface, Nearly 16 Million Tons of Microplastic," Oct. 7, 2020, describes how the constant introduction of plastic waste is threatening sea life in the oceans. Publicly shaming of companies is taking place because of their use of plastics in their packaging; thousands of volunteers each year conduct an annual audit to tabulate the worst offenders and then call them out. (Coca-Cola, Pepsi and Nestle named top plastic polluters for third year in a row; The Guardian, Dec. 7, 2020).

It makes sense for companies to reduce the amount of plastic used in packaging their products for both its environmental and marketing effects. No matter how convenient and inexpensive the use of such materials may be in packaging goods, it should be the goal to reduce their use whenever possible. The main focus of this application is to achieve such a goal. Current offerings for numismatic storage include boxes, tubes, slabs, capsules, and flips; all can be, and are, made from molded plastic. These storage devices maintain numismatics in proper separation to prevent damage to the engravings and embossing on its surfaces and allow the end-user to display their collection.

SUMMARY

According to this disclosure, precious metal and/or base metal numismatic members including bullions and coins may be embedded with a magnetic material disposed within their center where a hole has previously been created. The magnets being placed within the numismatic can remain visible to the end-user and may be derived from any magnetic material. Decorations and script can be disposed on the surfaces of the numismatic on its obverse side, its reverse side, its circumferential edge, and combinations thereof. The decorations and scripts can be applied either separately or in combination by embossing or debossing. Additionally, the numismatic may contain regions of precious metal material that are also embossed with portions of the material that stand out in relief, debossed with portions of material that are indented, or a combination thereof to prevent stacked numismatics from rubbing against each other in such a way that would mar their decorations and/or scripts.

One method of producing precious metal numismatics embedded with a magnetic material is disclosed, wherein the magnetic material is disposed within the center of the numismatic, where a hole exists, via use of a hydraulic press. First, step is loading the hydraulic press with a die which contains the desired design, then placing a precious metal and/or base metal numismatic member into the hydraulic press underneath the die. Once the precious metal and/or base metal numismatic member is loaded then engaging the hydraulic press to allow the die to emboss and deboss the precious metal and/or base metal numismatic member can occur; the die can also create a hollow region centrally disposed within the precious metal and/or base metal numismatic member. Disengaging the hydraulic press can then take place, allowing for the addition of a magnetic material that is slightly larger than the hollow region, over the hollow region. Finally, reengaging the press to force the magnet into the hollow region leaving a semi-permanent/reversibly-secured precious metal and/or base metal numismatic member with a centrally visible magnet.

Another method of producing precious metal numismatic embedded with a magnetic material is disclosed, wherein the magnetic material is disposed within the center of the precious metal numismatic, where a hole exists, via use of a hydraulic press. First, step is loading the hydraulic press with a die which contains the desired design, then placing a precious metal and/or base metal numismatic member into the hydraulic press underneath the die. Once the precious metal and/or base metal numismatic member is loaded then engaging the hydraulic press to allow the die to emboss and deboss the precious metal and/or base metal numismatic member may occur; also leaving a hollow region centrally disposed within the precious metal and/or base metal numismatic member. Disengaging the hydraulic press can then take place, allowing for the addition of a magnetic material that is nearly the same size as the hollow region within the member of the stamped precious metal and/or base metal numismatic member by applying epoxy to the circumference of the magnet, and then adhering the magnet to the hollow region within the member of the stamped precious metal and/or base metal numismatic member to form a semi-permanent/reversibly-secured precious metal and/or base metal numismatic member with a centrally visible magnet.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings.

DETAILED DESCRIPTION

Figure 1:
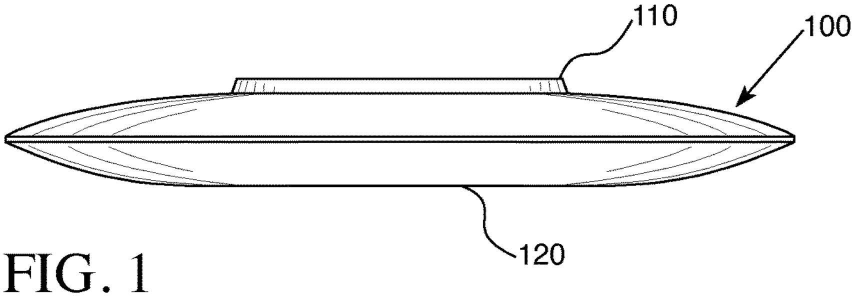
FIG. 1 is a side plan view of an embodiment of the current invention.

The present disclosure relates to magnetically stackable numismatics, and more particularly, to the use of precious metals and/or base metals in their construction and the methods to create such numismatics. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements; those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient. Still, these are intended to cover applications or embodiments without departing from the disclosure's spirit or scope. Also, it is to be understood that the phraseology and terminology used herein are for the purpose of description and should not be regarded as limiting.

Currently, production of numismatics including bullions and coins for collecting purposes can allow end-users to speculate on the value of precious metals, to amass such items for their rarity, or their decorative features. Such numismatic collections can require a means to store and maintain their value properly; proper storage can be achieved through various containers such as: sleeves, boxes, tubes, slabs, capsules, and flips. The predominant material which can be used to create these storage devices is plastic. To achieve the world-wide goal of reducing plastic waste, inventors are devising ways to replace such plastic devices with alternate means. Some simple ways to create an alternate means can be to replace the plastic material with a bio-degradable material; however, using such materials in some instances may not allow the achievement of the end-user's goal of displaying their collection. Many end-user collectors seek to openly display these items because of their value and/or decorative features. The present disclosure provides both the description of the device and the methods for the device's making.

Figure 2:
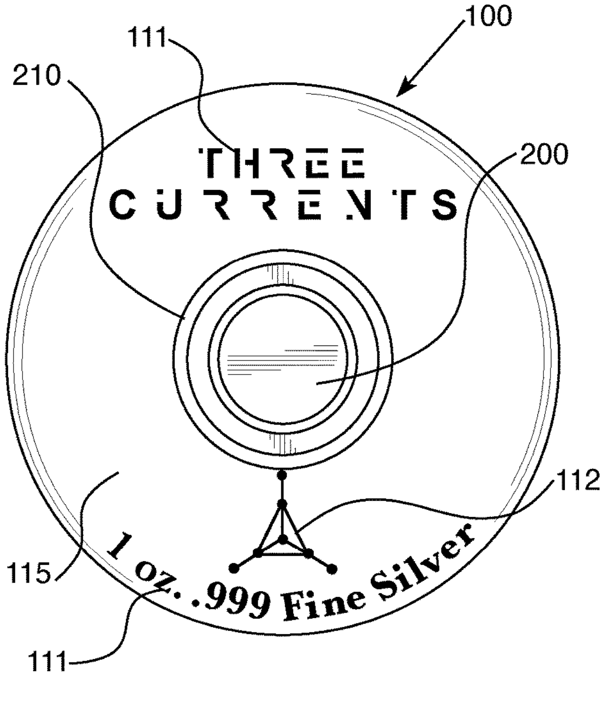
FIG. 2 is a top plan view of an embodiment of the current invention.
Figure 3:
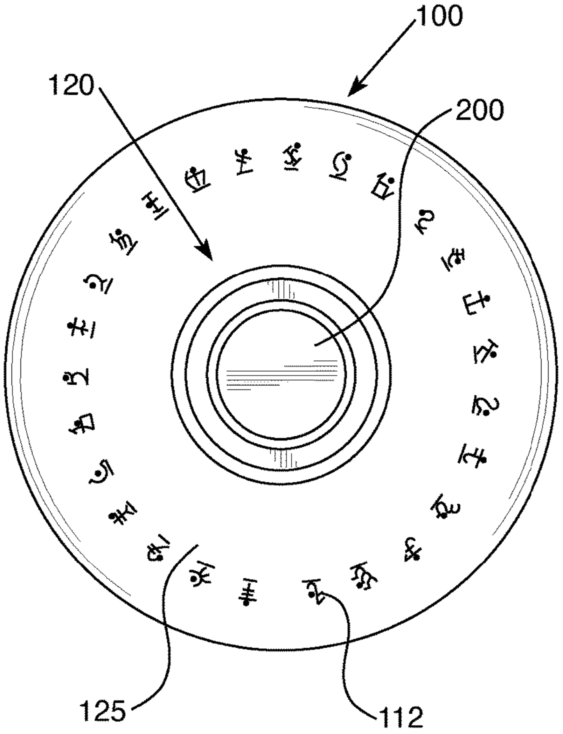
FIG. 3 is a bottom plan view of an embodiment of the current invention
Figure 4:
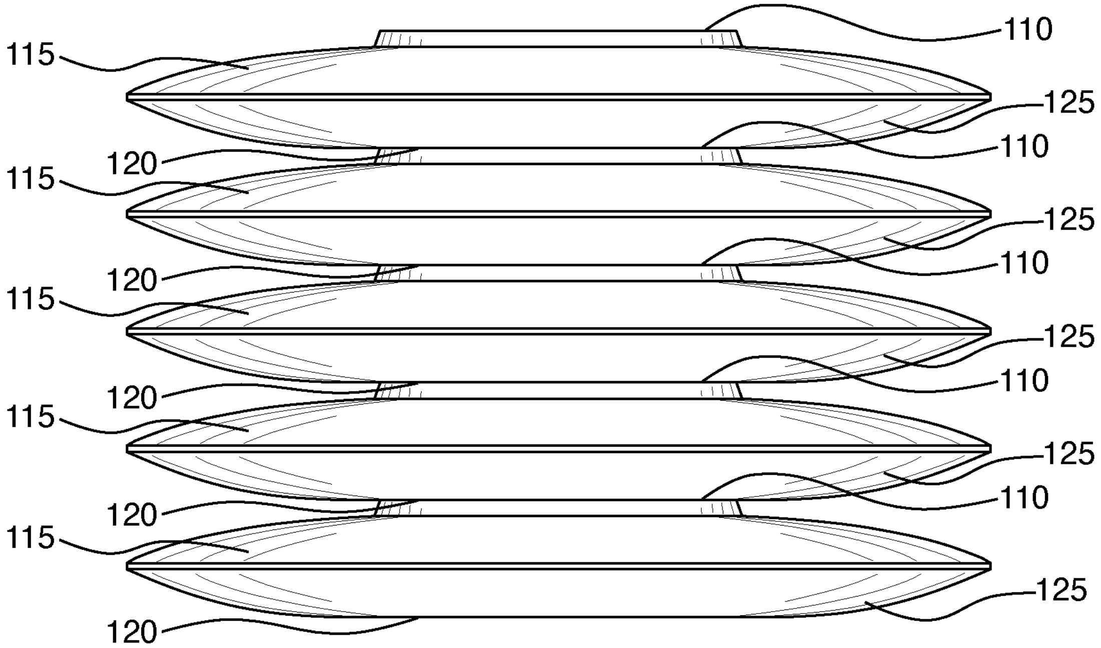
FIG. 4 is a side plan view of a stack of an embodiment of the current invention.
Figure 5:
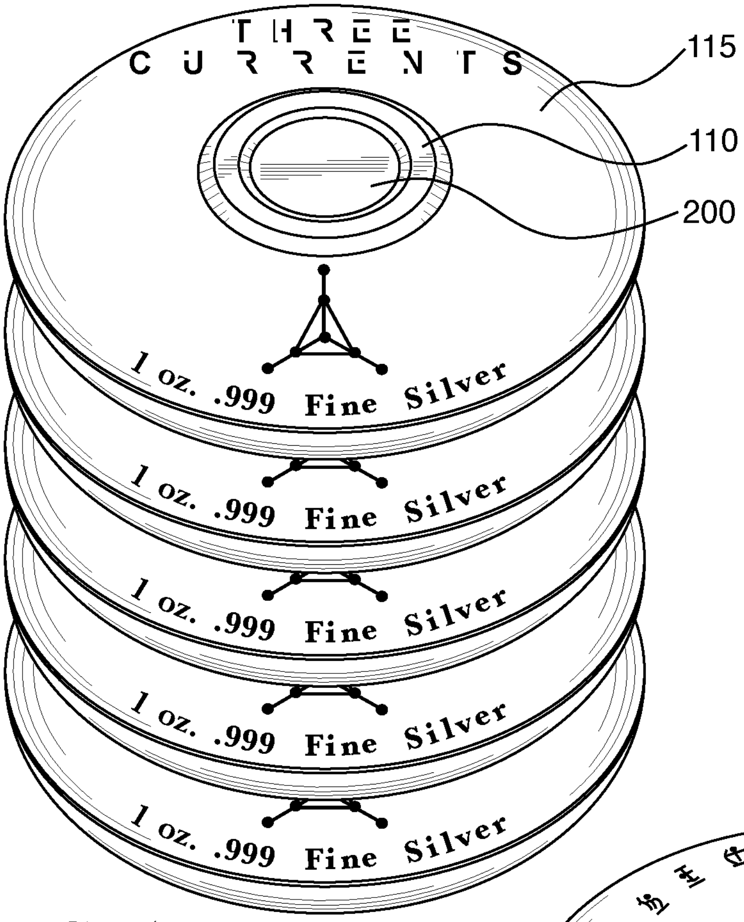
FIG. 5 is a top perspective view of a stack of an embodiment of the current invention.
Figure 6:
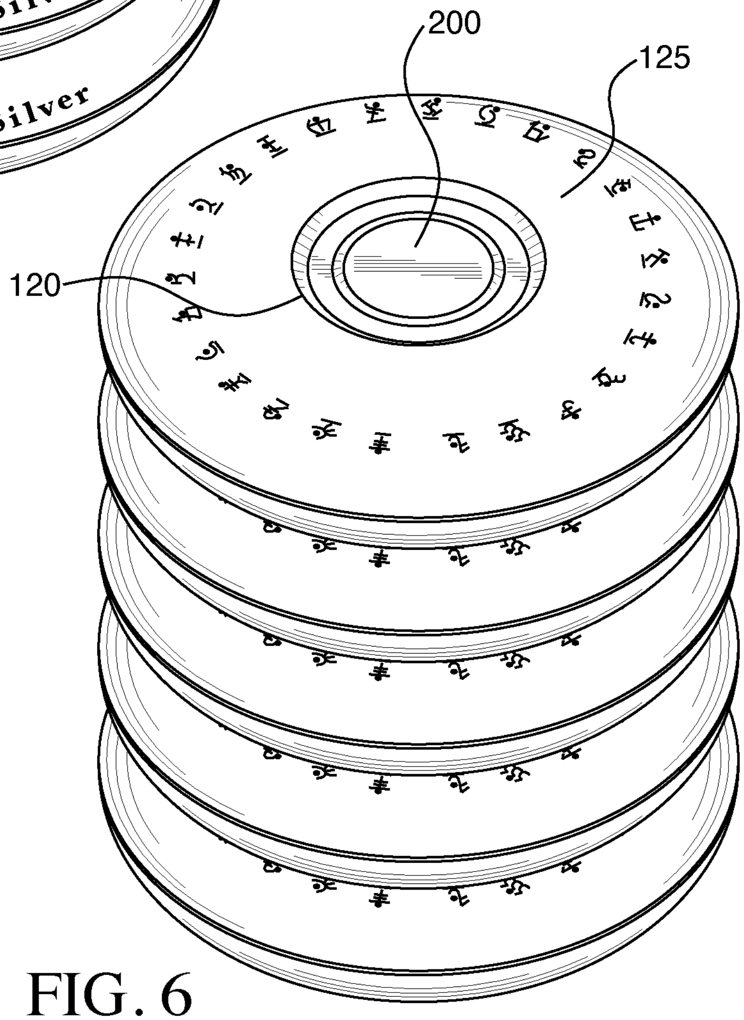
FIG. 6 is a bottom perspective view of a stack of an embodiment of the current invention.
Figure 7:
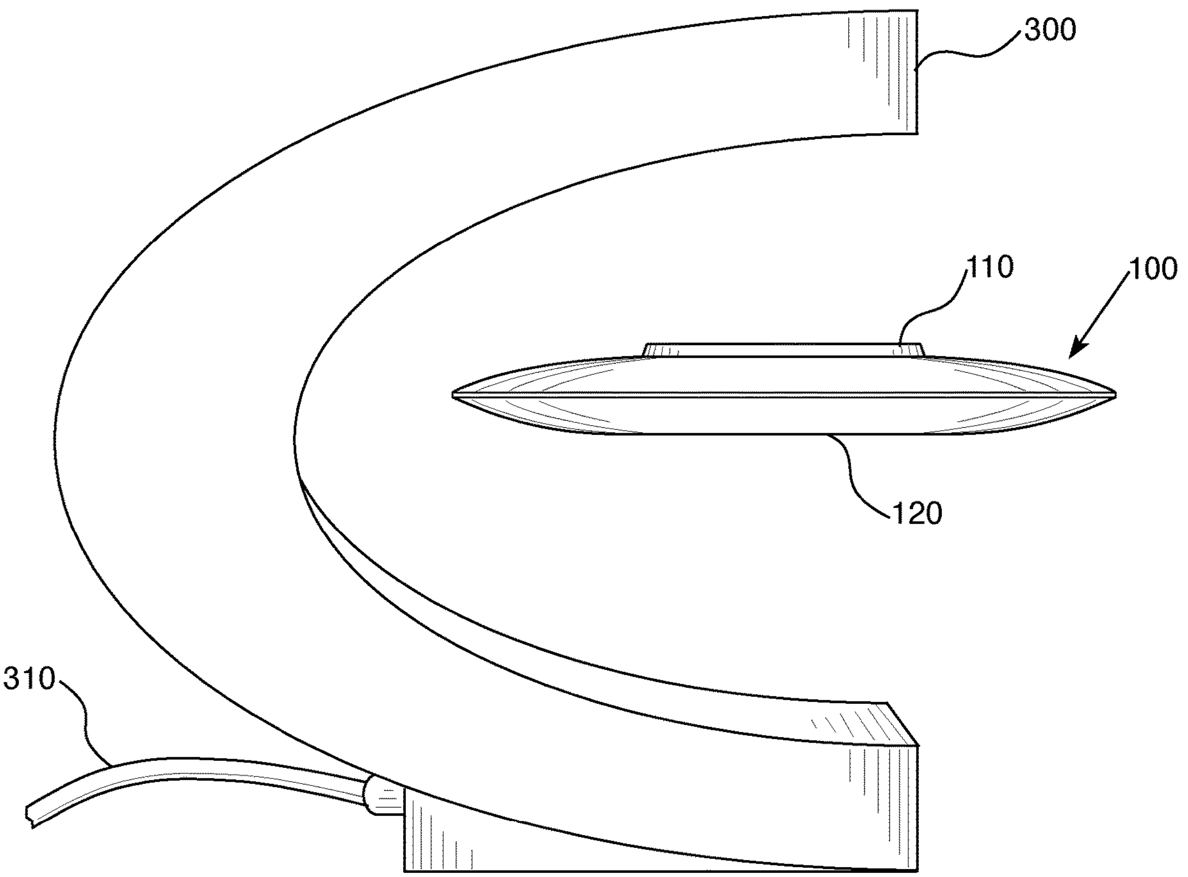
FIG. 7 is a side plan view of an embodiment of the current invention in a decorative display.

FIGS. 1-15 illustrate various views of multiple embodiments of the magnetically stackable numismatic. FIG. 1 is a side plan view of one embodiment of the present invention; this particular embodiment is circular and does not differentiate the differences between the left or right side. FIG. 2 shows a top plan view of the obverse side the embodiment in FIG. 1. FIG. 3 shows the bottom plan view of the reverse side of the embodiment in FIG. 1. FIG. 4 is a side plan view of five stacked examples of the embodiment in FIG. 1. FIG. 5 is a top perspective view of five stacked examples of the embodiment in FIG. 1. FIG. 6 is a bottom perspective view of five stacked examples of the embodiment in FIG. 1. FIG. 7 demonstrates the embodiment in FIG. 1 in a specialized display that utilizes the magnet embodied in FIG. 1 to suspend that embodiment within an electromagnetic field generated by the display device.

Figure 8:
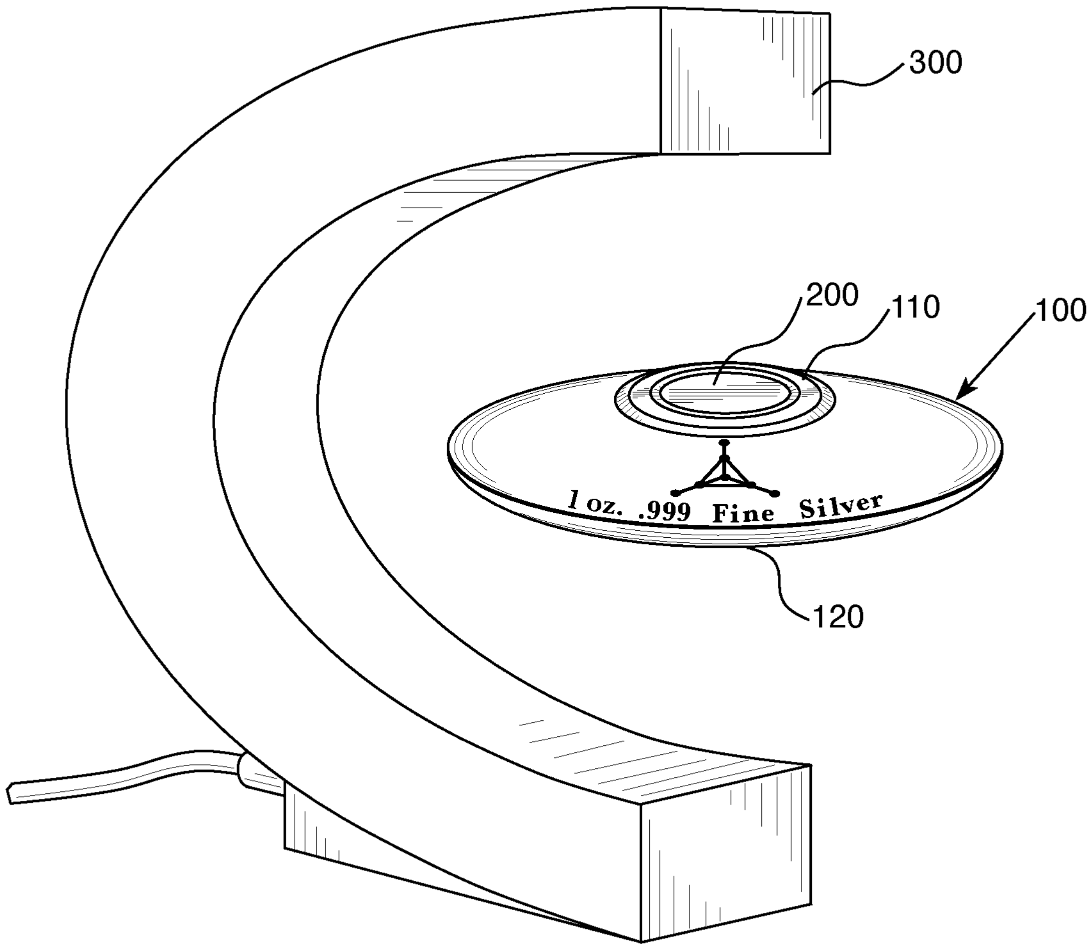
FIG. 8 is a perspective view of an embodiment of the current invention in a decorative display.
Figure 9:
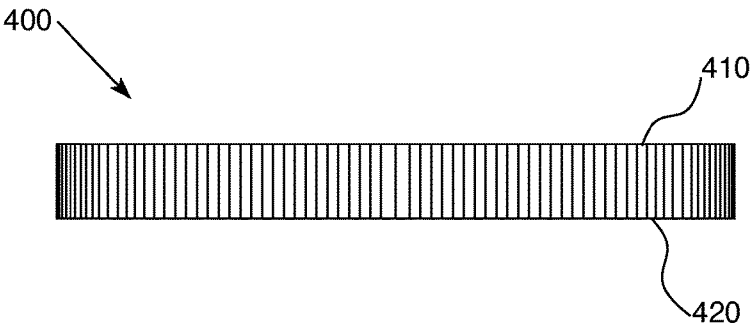
FIG. 9 is a side plan view of a second embodiment of the current invention.
Figure 10:
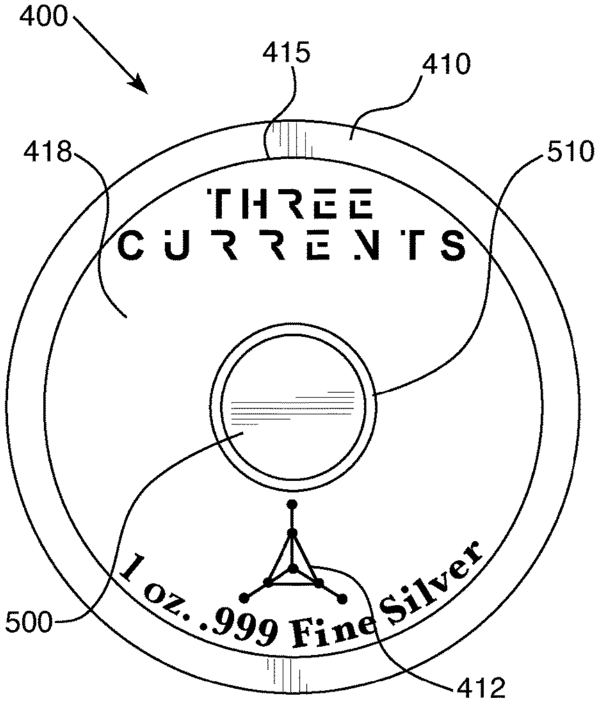
FIG. 10 is a top plan view of a second embodiment of the current invention.
Figure 11:
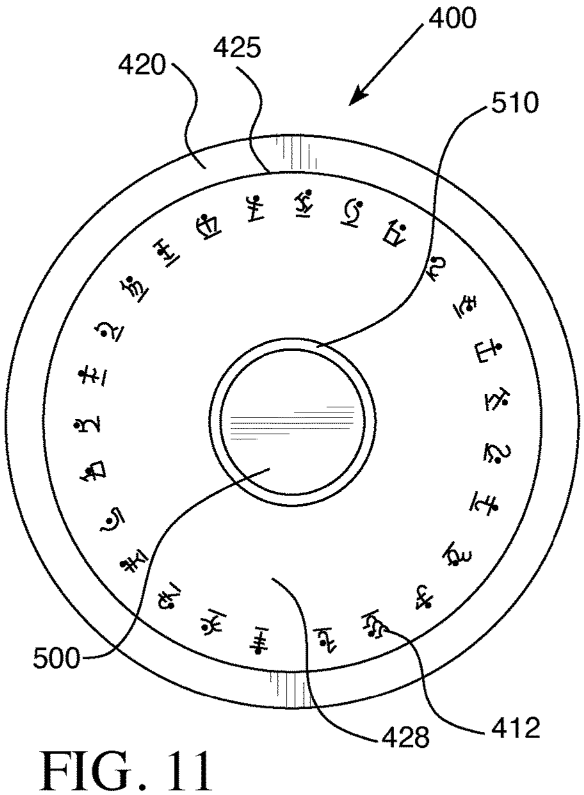
FIG. 11 is a bottom plan view of a second embodiment of the current invention.
Figure 12:
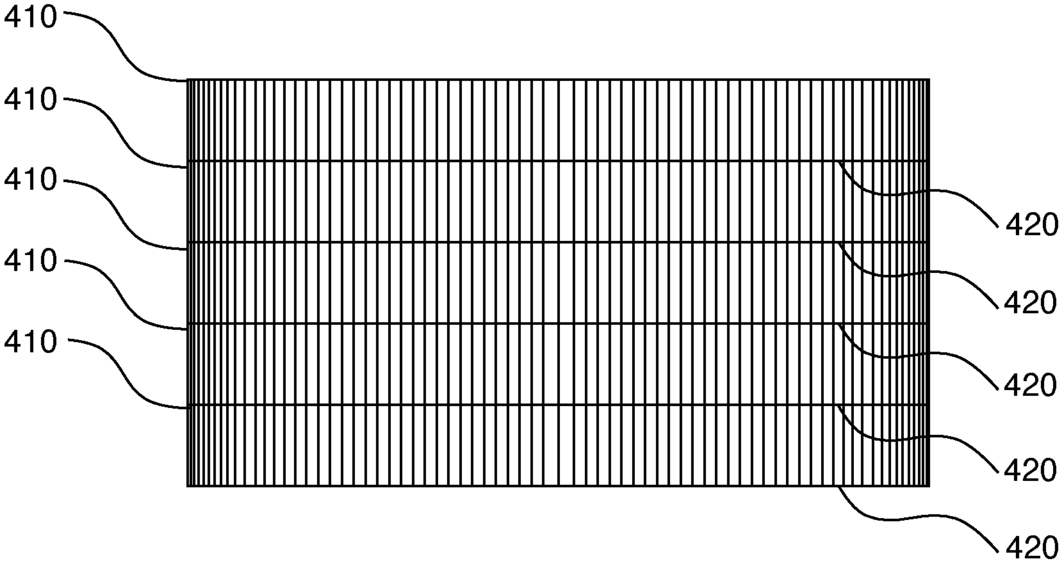
FIG. 12 is a side plan view of a stack of a second embodiment of the current invention.
Figure 13:
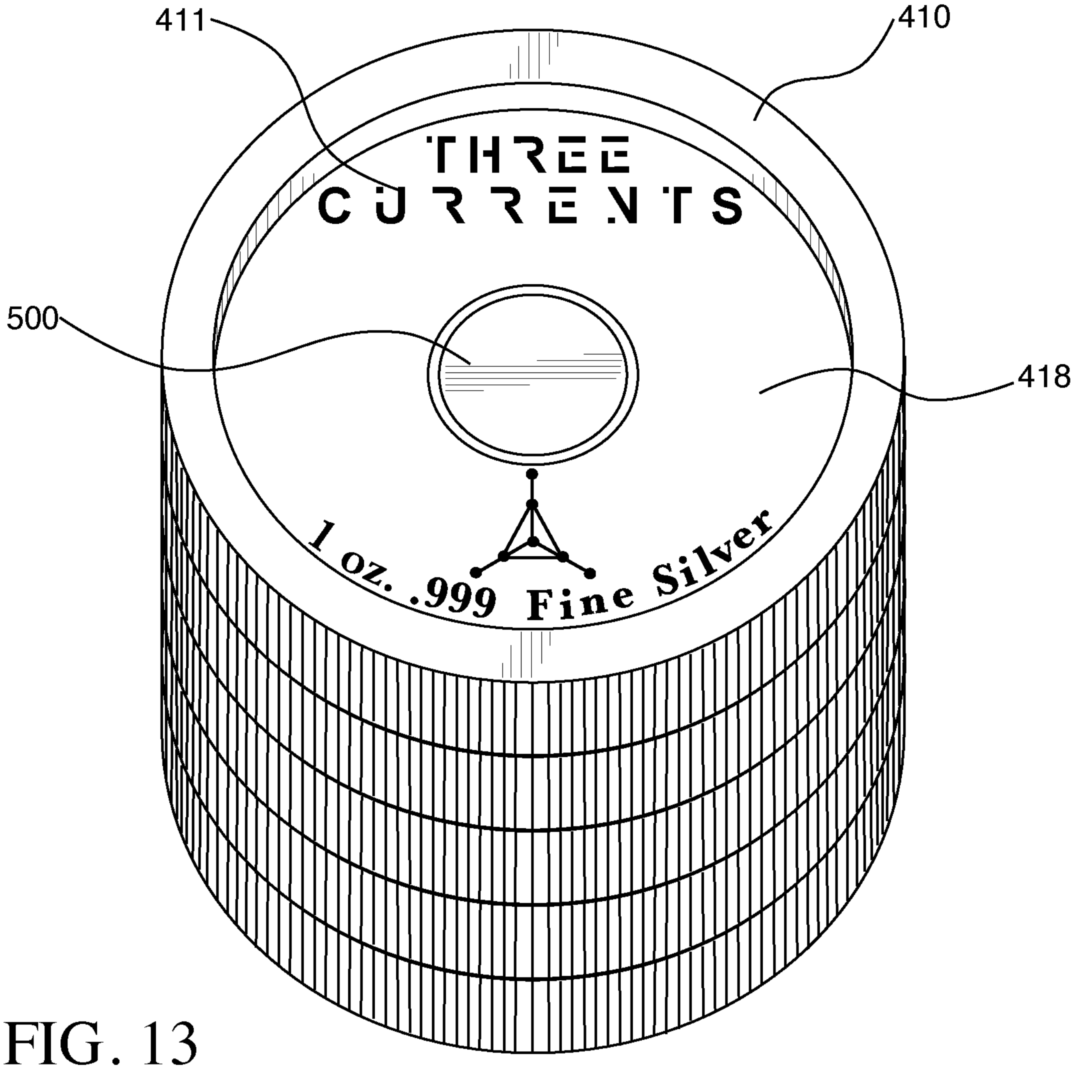
FIG. 13 is a top perspective view of a stack of a second embodiment of the current invention.
Figure 14:
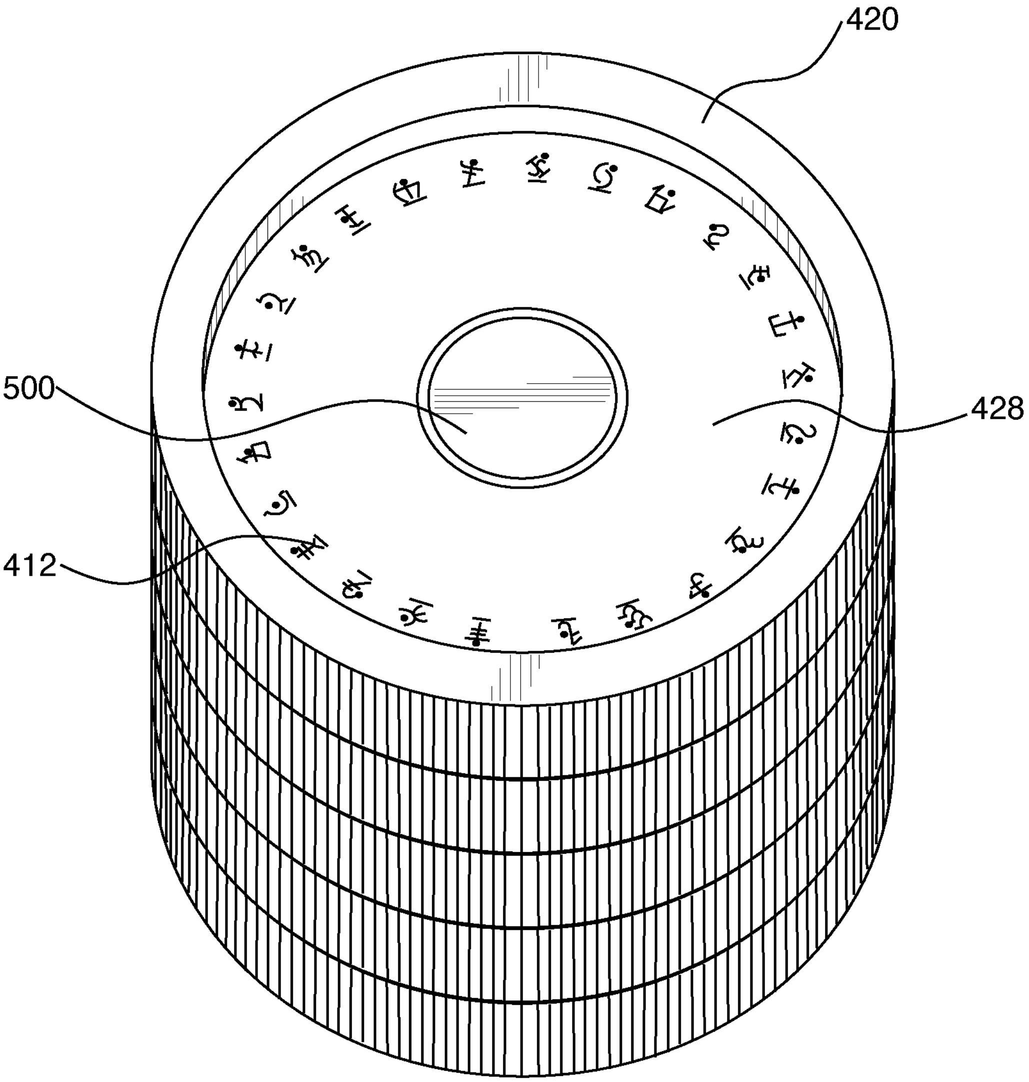
FIG. 14 is a bottom perspective view of a stack of a second embodiment of the current invention.

FIG. 8 is a side plan view of a second embodiment of the present invention; this particular embodiment is circular and does not differentiate the differences between the left or right side. FIG. 9 shows a top plan view of the obverse side the embodiment in FIG. 8. FIG. 10 shows the bottom plan view of the reverse side of the embodiment in FIG. 8. FIG. 11 is a side plan view of five stacked examples of the embodiment in FIG. 8. FIG. 12 is a top perspective view of five stacked examples of the embodiment in FIG. 81. FIG. 13 is a bottom perspective view of five stacked examples of the embodiment in FIG. 8. FIG. 14 demonstrates the embodiment in FIG. 8 in a specialized display that utilizes the magnet embodied in FIG. 8 to suspend that embodiment within an electromagnetic field generated by the display device.

In the embodiment of FIG. 1, the raised region of embossed material 110 can be annularly disposed around the magnet 200, not shown, of stackable numismatic 100 and may also be coaxial to the magnet 200 and the stackable numismatic 100. The magnet 200 may be comprised of any magnetic material whose physical properties allow for their semi-permanent, reversible securing of magnet 200 to the stackable numismatic 100. The debossed region 120 can be, as shown on the bottom, reverse side, of stackable numismatic 100 centrally located and coaxial to the stackable numismatic 100 and the magnet 200. This particular embodiment can be composed of 1 troy ounce of 99.9% pure silver. Other envisioned embodiments can use other precious metals and/or base metals to make up the material for a stackable numismatic 100. Such precious metals as gold, platinum, palladium, and any other precious metals that a person having ordinary skill in the art would consider applicable to use. The magnetic material that may be used for such combinations may vary depending on the strength desired or the decorative needs of the various embodiments of the magnetically stackable numismatic; such magnetic material which may be used can include neodymium iron boron magnets, samarium cobalt magnets, alnico magnets, ceramic magnets, or flexible magnets.

In the view of FIG. 2, magnet 200 can be embedded within a central hollow of stackable numismatic 100, and that the magnet 200 may be flush to both the obverse surface of FIG. 2 and the reverse surface of FIG. 3. In other envisioned embodiments, magnet 200 may also be proud or recessed to the obverse and reverse surfaces or any combination of flush, proud, or recessed to either surface. The deciding factor as to how the magnet can be secured to the precious metal numismatic can depend on the nature of the magnet and type of magnetic material being used for magnet 200. The magnet may be attached in a semi-permanent/reversible-secured configuration or attached via a friction fit. The method choice, of either using a friction fitting or adhesion by epoxy fitting, can depend on the chosen magnetic material's malleability. A brittle magnetic material may be combined with the precious metal via an epoxy. Such a magnet may almost certainly not remain intact with the friction fit method of embedding. However, a magnetic material that is more elastic may be semi-permanent/reversible-secured within the numismatic with use of either method. The friction fit or placement of the adhesive can occur at the junction 210 between the numismatic's material and the magnet 200.

Examples of debossed script 111 can be shown with the decorative title naming this embodiment "Three Currents" and describing the type and amount of precious metal used "1 oz. 0.999 Fine Silver" on the numismatic's obverse side 115 of this particular embodiment. Additionally, examples of debossed decorative elements 112 can be shown on the obverse side 115 and the reverse side 125. In this particular embodiment, such debossed decorative elements 112 can be on the numismatic's obverse side 115 and may be a creative denomination symbol, and on the reverse side 125, they may be a ring hieroglyphics.

In the embodiment of FIG. 3, the magnet 200 can be a rare earth magnet that has been positioned in a central hollow of stackable numismatic 100 and can be flush with the obverse surface 115 and the reverse surface 125 of stackable numismatic 100. Specifically, the magnet 200 can be flush to the surface of the raised region of embossed material 110 on the obverse side and flush to the debossed region 120 on the reverse side of stackable numismatic 100.

In FIG. 4, multiple stackable numismatics 100 can be configured within a stack. The raised region of embossed material 110 on the obverse side 115 fits within the debossed region 120 on the reverse side 125 of the subsequent stackable numismatic 100 in the stack. This particular embodiment of FIG. 4 demonstrates how multiple stackable numismatics 100 can be maintained within a user's collection without the need for a plastic or paper storage sleeve. This configuration can allow the user to display their stackable numismatic collection and maintain the collection's order. The magnets 200, not visible, can be chosen to provide strength enough to maintain the stack while still allowing the user to remove a single stackable numismatic 100 from the stack. In FIGS. 5 and 6 the magnet 200 is illustrated and can be seen in this embodiment as being coaxial to the stackable numismatic 100 and how the stacked stackable numismatics 100 align on the same axis, thus forming the stack. The interaction between the embossed material 110 and the debossed region 120 in a stack can prevent rubbing of a top stackable numismatic's 100 reverse side 125 and a bottom stackable numismatic's 100 obverse side 115, thus preventing damage to the surfaces and their debossed scripts and decorative elements. This can help maintain the surfaces in an unmarred state allowing the stackable numismatic 100 to be displayed in pristine condition.

In FIG. 7, decorative display 300 generates an electromagnetic field, which can then suspend a stackable numismatic 100 in mid-air by balancing the magnetic forces between the magnet 200, see FIG. 8, and the electromagnetic field. The electromagnetic field of decorative display 300 can be powered via the power supply line 310 which in turn connects to the internal field generator. In the prospective view of FIG. 8 the magnet 200 can be balanced between the electromagnetic filed generated by the decorative display 300. In further embodiments, decorative display 300 can be configured to display all other embodiments of stackable numismatic 100 wherein the stackable numismatic 100 can vary in shape and weight, and the embedded magnet 200 can vary in magnetic strength.

In another embodiment, illustrated in FIG. 9, the raised region of embossed material 410 can be annularly disposed around the exterior of stackable numismatic 400 and may be flush with the obverse rim 415 of the stackable numismatic 400, magnet 500 is not visible in this side view as it can be flush to the obverse surface 418 and the reverse surface 428 of a stackable numismatic 400. The magnet 500 may be comprised of any magnetic material whose physical properties allow for their semi-permanent, reversible securing of magnet 500 to the stackable numismatic 400. Illustrated in FIG. 10 is the top view of stackable numismatic 400, showing how the position of the magnet 500 can be coaxial to a stackable numismatic 400. The raised region of embossed material 420 as shown in FIG. 11, on the reverse surface 428 of a stackable numismatic 400 can disposed on the reverse rim 425. The embossed material 410 of the obverse surface 418 and the embossed material 420 on the reverse surface 428 can combine to form a single embossed region disposed on the obverse rim 415 and reverse rim 425.

Multiple stackable numismatics 400 can be joined together into a stack where the embossed material 410 of a first stackable numismatic 400 can align with and sit flush on the embossed material 420 of a second stackable numismatic. The common axis of the magnet 500 and the stackable numismatic 400 can provide the ability to align stacks of the stackable numismatic 400 into a uniform profile where the embossed material 410 of a first stackable numismatic and the embossed material 420 of a second stackable numismatic can create a gap between the obverse surface 418 and the reverse surfaces 428 of the first and second stackable numismatics 400. The provided gap between the two surfaces may prevent damage from occurring to the decorative elements 412 and the debossed script 411 from friction between the two surfaces. As illustrated in FIG. 12, the gap between the two surfaces is not shown. The embossed material 410 and embossed material 420 shield the surfaces within the gap from exposure.

This second embodiment can be composed of 1 troy ounce of 99.9% pure silver. Other envisioned embodiments may use other precious metals and/or base metals to make up the material for a stackable numismatic 400. Such precious metals as gold, platinum, palladium, and any other precious metals that a person having ordinary skill in the art would consider applicable to use. The magnetic material that may be used for such combinations may vary depending on the strength desired or the decorative needs of the various embodiments of the magnetically stackable numismatic; such magnetic material which may be used can include neodymium iron boron magnets, samarium cobalt magnets, alnico magnets, ceramic magnets, or flexible magnets.

In the views of FIGS. 10 and 11, magnet 500 can be embedded within a central hollow of a stackable numismatic 400, and that the magnet 500 can be flush to both the obverse surface 418 of FIG. 10 and the reverse surface 428 of FIG. 11. In other envisioned embodiments, magnet 500 may also be proud or recessed to the obverse surface 418 and reverse surface 428 or any combination of flush, proud, or recessed to either surface. The deciding factor as to how the magnet can be secured to the numismatic can depend on the nature of the magnet and type of magnetic material being used for magnet 500. The magnet may be attached in a semi-permanent/reversible-secured configuration or attached via a friction fit. The method choice, of either using a friction fitting or adhesion by epoxy fitting, can depend on the chosen magnetic material's malleability. A brittle magnetic material may be combined with the numismatic's material via an epoxy. Such a magnet may almost certainly not remain intact with the friction fit method of embedding. However, a magnetic material that is more elastic may be semi-permanent/reversible-secured within the numismatic with use of either method. The friction fit or placement of the adhesive can occur at the junction 510 between the precious metal and the magnet 500

Examples of debossed script 411 are shown with the decorative title naming this embodiment "Three Currents"

and describing the type and amount of precious metal used "1 oz. 0.999 Fine Silver" on the numismatic's obverse side of this particular embodiment. Additionally, examples of debossed decorative elements 412 are shown on the obverse surface 418 and reverse surface 428. In this particular embodiment, such debossed decorative elements 412 are on the numismatic's obverse side as a creative denomination symbol, and on the reverse side of FIG. 3, as the ring hieroglyphics.

In the embodiment of FIG. 11, the magnet 500 can be a rare earth magnet that can be positioned in a central hollow of stackable numismatic 400 and can be flush with the obverse surface 418 and reverse surface 428 of a stackable numismatic 400. Specifically, the magnet 500 can be flush to the obverse surface 418 while being below the level of the surface of the raised region of embossed material 410 on the obverse side and can be below the embossed material 420 on the reverse surface 428 of stackable numismatic 400.

In FIG. 12, multiple stackable numismatics 400 can be configured within a stack. The raised region of embossed material 410 on the obverse surface 418 can be positioned upon the embossed material 420 on the reverse surface 428 of a subsequent stackable numismatic 400 in the stack. This particular embodiment of FIG. 12 demonstrates how multiple stackable numismatics 400 can be maintained within a user's collection without the need for a plastic or paper storage sleeve. This configuration can allow the user to display their stackable numismatic collection and maintain the collection's order. The magnet 500, not visible, can be chosen to provide strength enough to maintain a stack while still allowing the user to remove a single stackable numismatic 400 from the stack. In FIGS. 13 and 14 the magnet 500 is illustrated and can be seen in this embodiment as being coaxial to the stackable numismatic 400 and how the stacked stackable numismatics 400 align on the same axis, thus forming the stack. The interaction between the embossed material 410 and the embossed material 420 in a stack may prevent rubbing of a top stackable numismatic's 400 reverse surface 428 and a bottom stackable numismatic's 100 obverse surface 418, thus preventing damage to the surfaces and their debossed scripts and decorative elements. This may help maintain the surfaces in an unmarred state allowing the stackable numismatic 400 to be displayed in a pristine condition.

Figure 15:
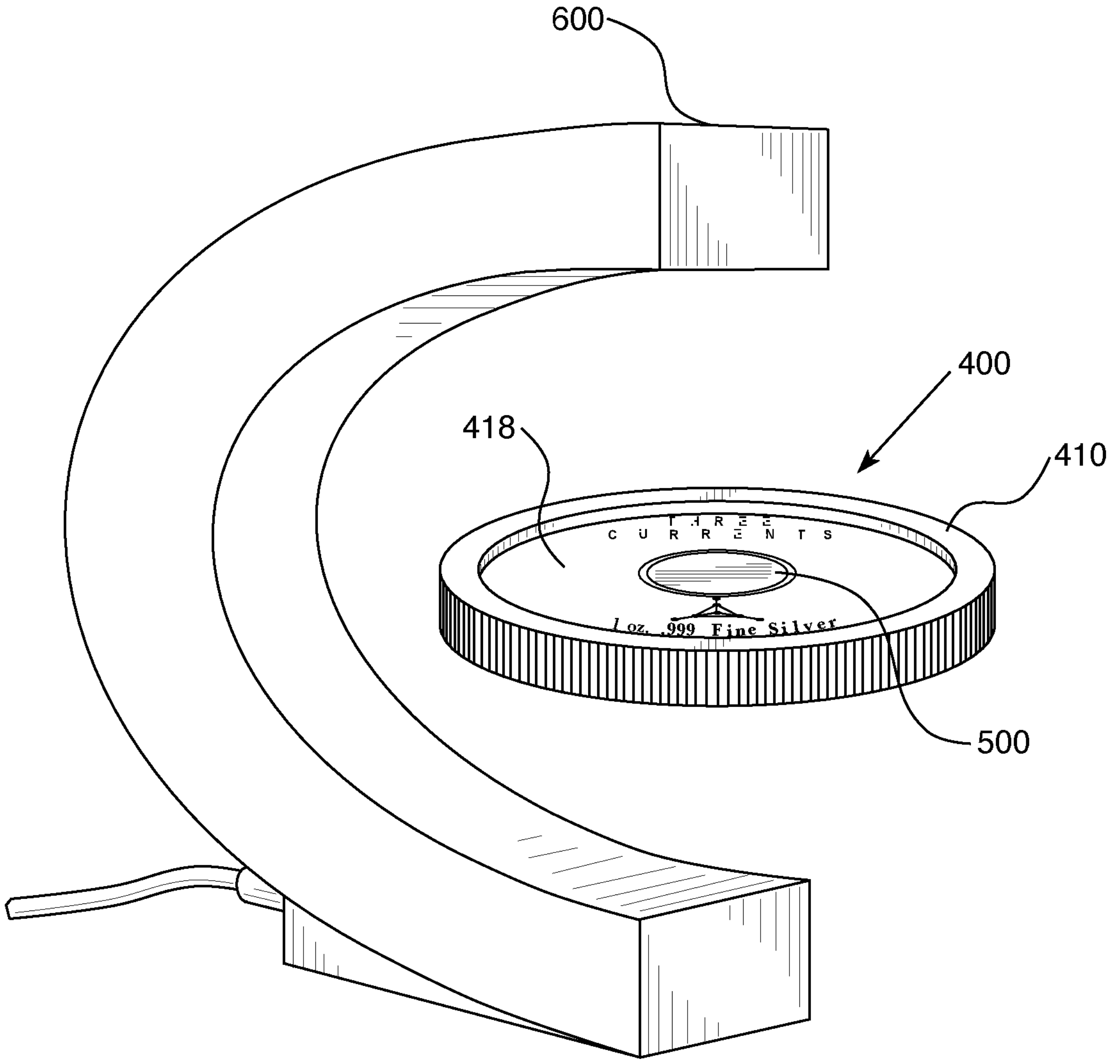
FIG. 15 is a perspective view of an embodiment of the current invention in a decorative display.

In FIG. 15, decorative display 600 generates an electromagnetic field, which can then suspend a stackable numismatic 400 in mid-air by balancing the magnetic forces between the magnet 500 and the electromagnetic field. The electromagnetic field of decorative display 600 can be powered via the power supply line 610 which in turn connects to an internal field generator, not shown. In the prospective view of FIG. 15 the magnet 500 can be balanced between the electromagnetic filed generated by the decorative display 600. In further embodiments, decorative display 600 can be configured to display all other embodiments of stackable numismatic 400 wherein the stackable numismatic 400 can vary in shape and weight, and the embedded magnet 500 can vary in magnetic strength.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is also intended to include features of a claim in any other independent claim even if this claim is not directly made dependent on the independent claim.

The invention claimed is:

1. A magnetically stackable numismatic comprising:

a numismatic member, wherein the numismatic member has a hollow region, an obverse side, and a reverse side, wherein the obverse side comprises a raised region of embossed material, wherein the raised region of embossed material of a first stackable numismatic is structured to fit on the reverse side of a second stackable numismatic; and a magnet, wherein the magnet is reversibly secured to the numismatic member within the hollow region.

2. The magnetically stackable numismatic of claim 1, wherein the magnet is positioned within the hollow region of the numismatic member such that the magnet is either flush, proud, or recessed to either the obverse side, or the reverse side, or combination thereof.

3. The magnetically stackable numismatic of claim 2, wherein the magnet is selected from the group consisting of Neodymium Iron Boron Magnets, Samarium Cobalt Magnets, Alnico Magnets, Ceramic Magnets, or Flexible Magnets.

4. The magnetically stackable numismatic of claim 3, wherein the numismatic member is a planchet.

5. The magnetically stackable numismatic of claim 1, wherein the raised region of embossed material, and a debossed region disposed on the reverse side are annularly disposed around the magnet.

6. The magnetically stackable numismatic of claim 5, wherein the raised region of embossed material of the first stackable numismatic fits within the debossed region of the second stackable numismatic.

7. A method for the production of magneticallystackable numismatic according to claim 1, the method comprising:

loading a hydraulic press with a die;

placing a numismatic member into the hydraulic press underneath the die;

engaging the hydraulic press to allow the die to conform the numismatic member according to claim 1;

disengaging the hydraulic press;

placing the reversibly-securable magnet, wherein the magnet is slightly larger than the hollow region, over the hollow region; and reengaging the press to force the magnet into the hollow region.

8. The method for the production of magnetically stackable numismatic of claim 7, wherein the reverse side includes a debossed region that is structured to contain the raised region of embossed material of a second stackable numismatic.

9. A method for the production of magnetically stackable numismatic according to claim 1, the method comprising:

loading a hydraulic press with a die;

placing a numismatic member into the hydraulic press underneath the die;

engaging the hydraulic press to allow the die to conform the numismatic member according to claim 1;

disengaging the hydraulic press;

applying epoxy to the circumference of the reversibly-securable magnet, wherein the magnet is the same size as the hollow region within the numismatic member; and adhering the magnet to the hollow region within the numismatic member.

10. The method for the production of magnetically stackable numismatic of claim 9, wherein the reverse side includes a debossed region that is structured to contain the raised region of embossed material of a second stackable numismatic.

* * * * *